United States Patent [19]

Ohman et al.

[11] Patent Number: 5,014,950

[45] Date of Patent: May 14, 1991

[54] MOUNTING CLAMP FOR SECURING APPARATUS TO OUTSIDE OF TIE ROD CYLINDER

[75] Inventors: Lachlan Ohman, Bryan; Gary L. Meyer, Montpelier, both of Ohio

[73] Assignee: The ARO Corporation, Bryan, Ohio

[21] Appl. No.: 344,367

[22] Filed: Apr. 28, 1989

[51] Int. Cl.$^5$ .............................................. A47B 96/06
[52] U.S. Cl. ................... 248/231.5; 248/500
[58] Field of Search ................ 248/231.6, 231.5, 230, 248/316.5, 316.6, 500

[56] References Cited

U.S. PATENT DOCUMENTS

| | | | |
|---|---|---|---|
| 2,080,261 | 5/1937 | Funk | 248/231.5 X |
| 2,964,869 | 12/1960 | Berghoff et al. | 248/231.5 X |
| 4,230,023 | 10/1980 | Ward | 248/500 X |
| 4,616,797 | 10/1966 | Cramer | 248/231.5 X |
| 4,674,722 | 6/1987 | Danby et al. | 248/231.5 X |
| 4,846,431 | 0/0000 | Pflieger | 248/231.5 X |

Primary Examiner—Carl D. Friedman
Assistant Examiner—Daniel Hulseberg
Attorney, Agent, or Firm—Allegretti & Witcoff

[57] ABSTRACT

A clamping assembly to hold a magnetically operated electrical switch against the outside surface of a tie rod type pneumatic cylinder includes first and second clamp members pivotally cooperative with one another and retained by fastening means in cooperation with the switch. The clamp members include converging surfaces which cooperate with a tie rod to tightly draw the clamp onto the rod against a cylinder for a wide range of cylinder sizes.

4 Claims, 2 Drawing Sheets

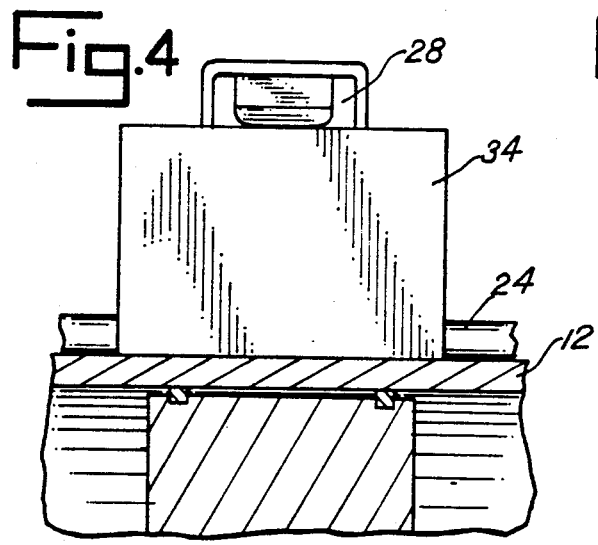
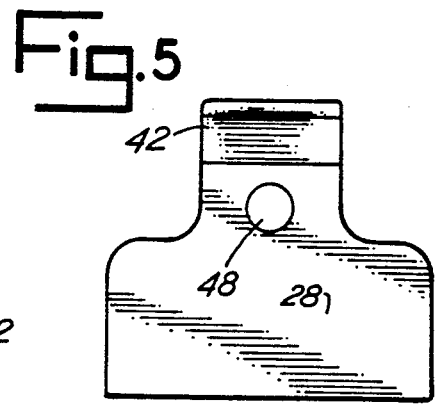
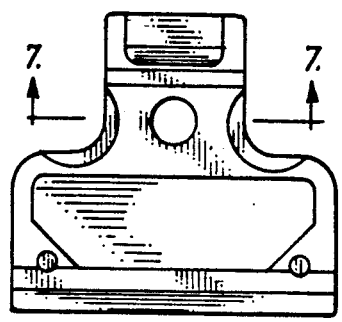
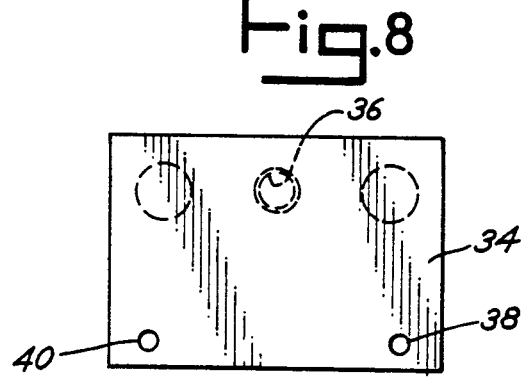
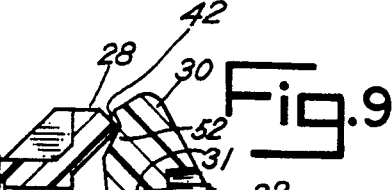
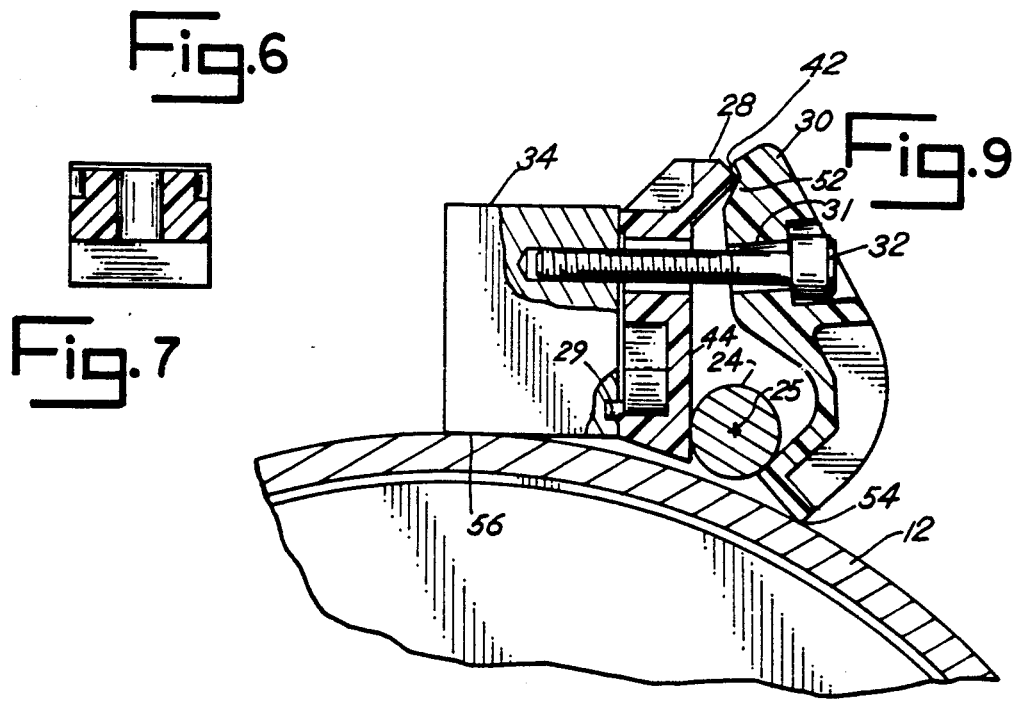

MOUNTING CLAMP FOR SECURING APPARATUS TO OUTSIDE OF TIE ROD CYLINDER

BACKGROUND OF THE INVENTION

This invention relates to an improved clamping assembly designed to attach a magnetically operated electrical switch to a tie rod and against the outside surface of a pneumatic cylinder in such a way that the piston within the cylinder will appropriately interact with the switch.

The invention further relates to a clamping assembly which is useful with cylinders having a wide range of diameters thereby eliminating the need to have multiple clamp assemblies available for use depending upon the particular size of the cylinder with which the switch is to be used.

Fluid operated or pneumatic cylinders are controlled by various sensors and switches designed to sense the position of a reciprocating piston within the cylinder. Thus, a cylinder generally includes a cylindrical shaped tube with a piston reciprocally mounted therein. The tube is typically surrounded by tie rods which connect and hold caps or heads at the opposite ends of the tube. A sensor or electrical switch is mounted at a position along the tie rod of the cylinder to sense the piston as its passes the sensor. The piston typically will include a magnet that actuates a reed switch, for example, associated with the sensor.

Heretofore various types of mounting systems have been available for attaching such a magnetically operated sensor to a cylinder tie rod. For example, Thomas White, Ltd. of England manufactures a two part clamp assembly which fits under the tie rod adjacent to the cylinder. A connecting band between the two clamp parts is adjustable depending upon the size of the cylinder.

Canfield Industries of Youngstown, Ohio has sold another two part clamp which includes a hook member that fits over the tie rod. The hook thus holds the switch against the side of the cylinders.

These prior art constructions have various problems. For example, the Canfield product may slip or pivot in an undesirable fashion on the tie rod. Also, the Canfield product may not be useful for cylinders of varying size. The Thomas White product may not fit through the space between the tie rod and the cylinder wall of a cylinder and it may not fit with the desired sensor. Thus, there has remained a need for an improved clamp assembly for securing apparatus to a tie rod for holding a switch against the outside surface of a cylinder.

SUMMARY OF THE INVENTION

Briefly, the present invention comprises a clamping device which cooperates with an implement or apparatus to hold that apparatus in a pre-determined position against the outside of a cylinder. The clamping apparatus of the invention includes a first clamp member cooperative with a second clamp member. Each clamp member includes a surface which converges toward the cylinder and engages a cylinder tie rod when doing so. The first clamp member also cooperates with or attaches to the apparatus or implement which is to be mounted against the outside surface of the cylinder. The second clamp member also includes a contact point or rib for engaging the outside cylinder surface. The first and second clamp members pivotally cooperate with one another and are retained together in combination with the apparatus or switch by means of a fastening device such as a threaded bolt.

The improved clamp construction of the present invention is useful in combination with tie rods and cylinders having a wide variety of sizes because the cooperating clamp surfaces engage the tie rod and converge toward the cylinder in order to effectively draw the assembly tightly against the outside cylinder surface as the fastening means are tightened. Thus there are two points or lines of contact between the tie rod and the clamp construction. Additionally, the construction relies upon line contact between the clamp member and cylinder surface as well as the switch (or apparatus) or the cylinder surface. Thus there are two points of contact between the cylinder surface and the clamping device or assembly. In sum, the clamp construction is designed to cause the entire assembly to converge tightly and move tightly against the cylinder wall.

Thus, it is an object of the invention to provide an improved clamp construction for attachment of a sensor or other apparatus to the outside of a tie rod cylinder.

A further object of the invention is to provide an improved clamp assembly which is useful in combination with tie rod cylinders having a wide variety of diameters.

Yet another object of the invention is to provide an easily used, and economically manufactured clamp construction for use in combination with a switching apparatus or sensing apparatus that is to be attached to the outside of a tie rod cylinder.

These and other objects, advantages and features of the invention will be set forth in the detailed description which follows.

BRIEF DESCRIPTION OF THE DRAWING

In the detailed description which follows, reference will be made to the drawing comprised of the following figures.

FIG. 4 is a side cross-sectional view of the improved clamp construction of the invention in combination with a tie rod cylinder taken substantially along the line 4—4 in FIG. 3;

FIG. 5 is a plan view of a first clamp member of the construction;

FIG. 6 is a plan view of a second clamp member of the construction;

FIG. 7 is a cross-sectional view of the second clamp member of FIG. 6 taken along the line 7—7;

FIG. 8 is a plan view of a typical switch apparatus which is incorporated with the clamps of FIGS. 5 and 6; and FIG. 9 is a cross-section view similar to FIG. 3 depicting the manner in which the improved clamp construction of the present invention is used in combination with a large diameter cylinder as compared with the smaller diameter cylinder depicted in FIG. 3.

DESCRIPTION OF THE PREFERRED EMBODIMENT

Figure 1:
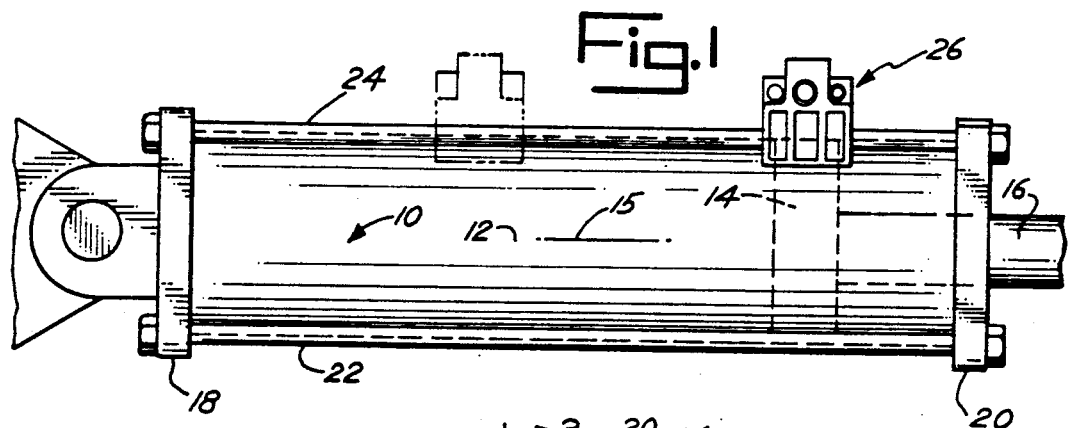
FIG. 1 is a side elevation of a typical tie rod cylinder wherein the improved clamp construction of the present invention is depicted as being attached to a tie rod associated with a cylinder.
Figure 2:
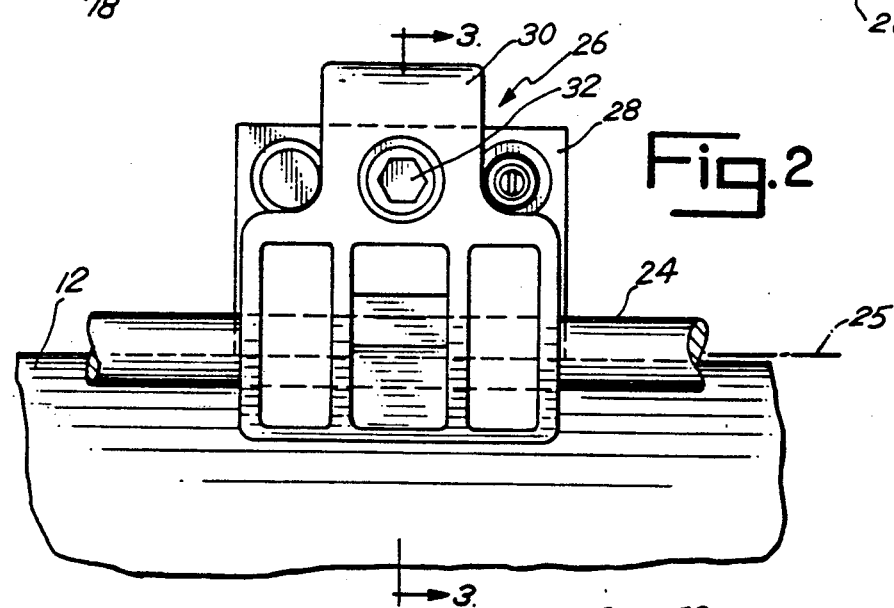
FIG. 2 is an enlarged side elevation of the clamp construction of the present invention attached to a tie rod of a cylinder.

The clamping assembly of the present invention is designed to hold a magnetically operated, electrical switch against the outside surface of a tie rod type pneumatic or fluid cylinder. As depicted in FIG. 1 a tie rod type cylinder 10 includes an outer tube or shell 12 having a cylindrical shape. A piston 14 is mounted for a reciprocal movement in tube 12. The piston 14 cooperates with a rod 16 which reciprocates therewith. At opposite ends of the shell or cylindrical tube 12 are end plates 18 and 20 which are retained in position by four, equally spaced tie rods 24. The described construction of the pneumatic cylinder or fluid cylinder assembly is typical.

A typical manner to control operation of such a cylinder relies upon sensors which locate the position of the piston within the cylinder. This is often accomplished by providing a magnet within the piston 14 which is sensed by a sensor or switch on the outside of tube or cylinder 12 as the piston 14 reciprocates within the tube 12. The switch or sensor is most typically held against the cylinder 12 by means of some type of clamping mechanism which cooperates with a tie rod, for example, tie rod 24. One or more such sensors may be positioned on the tie rod 24 in order to provide a series of signal to control equipment associated with cylinder 10.

The present invention contemplates an improved clamping assembly 26 which is depicted in FIG. 1 attached to the tie rod 24. The clamping assembly 26 holds a switch or sensor 34 on the cylinder tube 12 in a proper orientation and a proper location. Further, the clamping assembly 26 prohibits the associated switch or sensor 34 from swinging away from the cylinder tube 12 and thereby prevents formation of a gap between the sensor 34 and a cylinder 12. Such a gap would impact adversely on the sensing capability of the switch or sensor 34. Another important feature of the present invention is that the clamping assembly 26 is useful with a family of cylinders ranging in size from those having a one and one-half inch bore up to a cylinder having a six inch bore. Of course, by scaling the clamping assembly 26 in an appropriate fashion, the clamping assembly may be used with families of cylinders having other ranges of size.

Referring to the remaining FIGURES the clamping assembly 26 is comprised of a first clamp member 28 that is cooperative with a second clamp member 30 and fastening means 32 to support a body or switch or apparatus 34 in an appropriate position on the cylinder tube 12 by attachment to a tie rod 24. Note that the tie rod 24 defines an axis 25 which is generally parallel to axis 15 of the cylinder tube 12.

The sensor switch or apparatus 34 as shown in FIG. 8 includes a threaded opening or bore 36 and two spaced pin openings 38 and 40. The sensor 34 is a generally rectangular parallel piped which includes a reed switch, for example, which must be appropriately juxtaposed against the wall of cylinder tube 12 in order for the switch 34 to appropriately sense the magnetic portion of the piston 14 as it reciprocates along axis 15. In the embodiment shown therefore the switch or body 34 is a separate component apart from the clamp mechanism although it is possible to manufacture the first clamp member 28 integrally with the body 34.

Figure 3:
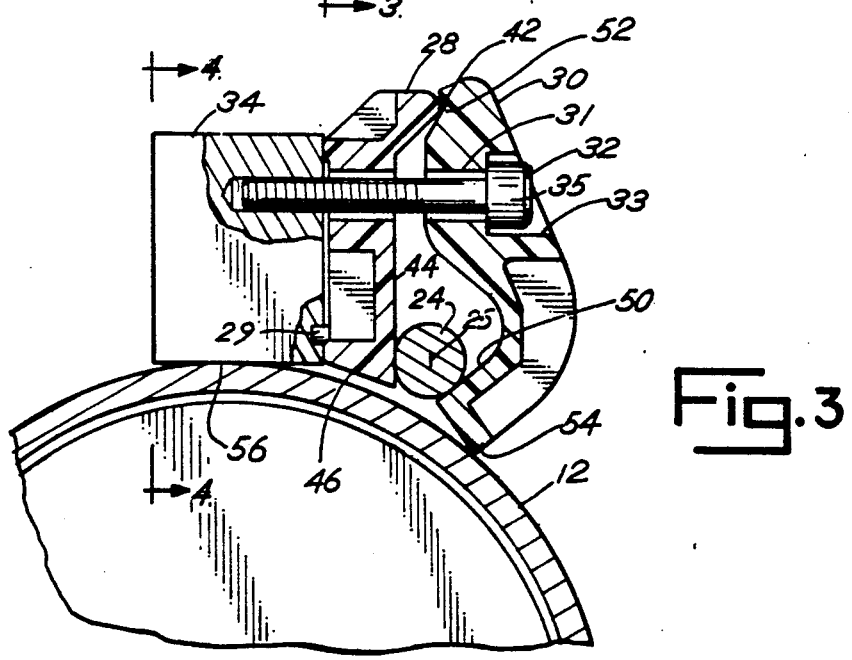
FIG. 3 is a cross-sectional view of the clamp construction of the invention taken substantially along the lines 3—3 in FIG. 2.

The first clamp member 28 is depicted, in part, in FIG. 5 as well as in FIGS. 3 and 9. The first clamp member 28 includes a pivot edge 42 which is parallel to the axes 25 and 15 when the assembly or clamp construction is assembled. The edge or ridge 42 defines a pivot axis for the clamp construction 26. The first clamp 28 also includes a generally planar surface 44 which is also parallel to the axis 25 in the assembled condition. The first clamp member 28 is designed so that it does not extend toward the cylinder tube 12 sufficiently to engage the outer wall of the tube 12. Thus end 46 is somewhat foreshortened. A center passage 48 is defined through the first clamp member 28 for receipt of a threaded bolt or fastening means 32. Also the body 34 may have any desired shape so long as the lower surface 56 is flat and in the same position relative to first clamp member 28 and the surface adjacent to clamp member 28 will mate with the openings 38, 40 in the sensor switch 34. It should also be noted that the first clamp member 28 includes pins such as pin 29 cooperative with openings such as opening 40 and 38 of the block 34 to retain the first clamp member in a desired position relative to that block 34.

The second clamp member 30 has a special configuration as depicted in FIGS. 3 and 9 to define a converging surface 50 which is generally parallel to axis 25. The second clamp member 30 also includes a pivot slot 52 cooperative with the ridge 42. The ridge 42 and slot 52 thus define a cooperative hinging relationship for pivotal movement about the ridge 42 which is parallel to the axis 25. The opposite end of the second clamp member 30 terminates in a toe or boot 54 which is designed to engage against the outer surface of the cylindrical tube 12. Importantly, the surface 40 and the surface 44 are both parallel to the axis 25. Also, quite importantly the surfaces 44 and 50 converge toward the cylinder tube 12. This arrangement is important inasmuch as when the fastening means or bolt 32 is tightened, the converging surfaces 50 and 44 engage the rod 24 and will tend to draw the clamp 26 inwardly toward the cylinder 12. The toe or boot 54 as well as the abutment or surface 56 of the switch will both engage the tube 12 to limit the inward travel of the tightened clamp. The converging surfaces 50 and 44 thus insure that the clamp 26 is drawn toward the cylinder 12, and the contact points or surface 56 and toe 54 control the position of the entire clamp assembly relative to the cylindrical tube 12.

As depicted in FIGS. 3 and 9 the clamp assembly of the invention is useful with a wide variety of cylinders and tie rods. In FIG. 3 the tie rod 24 as well as the cylinder tube 12 have a lesser diameter than the tie rod 24 and cylinder 12 of FIG. 9. In each instance, however, assembly 26 works in substantially the same way to position the switch body 34 tightly against the cylinder tube 12 in a position which is generally at a right angle with respect to a radius of the cylindrical tube 12. Both of these characteristics are important and are a result of the unique construction of the present invention.

Note that the second clamp 30 also includes a passage 31 for receipt of the fastening means 32 and a counterbore 33 for receipt of the head 35 of the fastening means 32 to thereby facilitate orientation and retention of the fastening means 32 within the second clamp member 30. Another feature that should be noted is that the size of the passage 31 is such that its diameter is slightly greater than the diameter of the fastening means 32. This enables some deviation of the positioning of the clamp member 30 as depicted in FIG. 9 relative to FIG. 3.

It is possible to vary the construction of the invention in accord with a desired range of sizes of cylinders and in accord with other mechanical requirements associated with attachment of a body to a tie rod cylinder. The clamp may also be varied slightly in construction to accommodate clamping to tie rods unique distinct cross sectional shapes such as shapes other than cylinders. Thus, the invention is to be limited by the following claims and their equivalents.

What is claimed is:

1. An improved clamp construction for attachment and support of a sensor to a tie rod or the like and against the outside surface of a cylinder, wherein the clamp construction has a universal size for use on cylinders having a wide range of cylinder diameters, said clamp construction comprising, in combination; a cylinder having an outside surface with a tie rod defining an axis radially spaced from the outside surface of the cylinder;

a sensor body having a sensor surface for positioning against the outside surface of the cylinder adjacent a tie rod;

a first clamp member cooperatively engaged with the sensor body, said first clamp member also having a first tie rod engaging surface generally parallel to the axis of the tie rod and cooperatively engageable with the tie rod along a line of contact also generally parallel to the tie rod axis, said first clamp member spaced radially outward from the cylinder and including a first clamp member pivot end also spaced radially outward from the cylinder beyond the radial position of the tie rod;

a shaped second clamp member having a second pivot end and an opposite cylinder outside surface engaging end, said pivot end cooperative with the first clamp member pivot end, said shaped second clamp member also including a second tie rod engaging surface generally parallel to the tie rod axis and convergent with the first tie rod engaging surface of the first clamp member; and fastening means for attaching the shaped second clamp member to the sensor body and for simultaneously pivoting the shaped second member clamp about the second pivot end against the tie rod and defining means to engage both the first and second tie rod engaging surfaces in contact with the tie rod converging toward the cylinder to simultaneously force the body sensor surface and shaped second clamp member cylinder outside surface engaging end against the outside surface of the cylinder.

2. The clamp construction of claim 1 wherein the first clamp pivot end comprises a recess and the second clamp pivot end comprises a cam cooperative with the recess.

3. The clamp construction of claim 1 wherein the first clamp member is a part that is separate from the sensor body.

4. The clamp construction of claim 1 wherein the sensor body includes a sensor at the sensor surface.

* * * * *